United States Patent
Bullen

(10) Patent No.: US 6,231,280 B1
(45) Date of Patent: May 15, 2001

(54) VIBRATION-ABSORBING END EFFECTOR OF AN AUTOMATED DRILL AND COUNTERSINK MACHINE

(75) Inventor: George Nicholas Bullen, Oxnard, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 09/371,205

(22) Filed: Aug. 10, 1999

(51) Int. Cl.⁷ .................................................. G23B 47/00
(52) U.S. Cl. ............................. 408/143; 408/97; 408/13; 409/141
(58) Field of Search ................................ 408/143, 95, 97, 408/234, 1 R, 13, 16; 409/141, 134; 483/901

(56) References Cited

U.S. PATENT DOCUMENTS

| | | | |
|---|---|---|---|
| 1,058,149 | * 4/1913 | Campbell | 408/112 |
| 3,301,333 | 1/1967 | Linsker | 173/19 |
| 4,157,231 | 6/1979 | Phillips | 408/1 |
| 4,268,195 | * 5/1981 | Regenbrecht | 408/16 |
| 4,637,775 | * 1/1987 | Kato | 414/744.2 |
| 4,676,127 | * 6/1987 | Watanabe | 408/13 |
| 4,884,941 | * 12/1989 | Kazerooni | 414/744.5 |
| 4,944,643 | * 7/1990 | Lehmkuhl | 408/11 |
| 4,955,119 | 9/1990 | Bonomi et al. | 29/50 |
| 5,109,592 | 5/1992 | Muselli | 483/4 |
| 5,123,789 | 6/1992 | Ohtani et al. | 408/1 |
| 5,139,376 | * 8/1992 | Pumphrey | 408/1 R |
| 5,161,921 | 11/1992 | Corsi | 408/1 |
| 5,165,829 | * 11/1992 | Ross et al. | 409/125 |
| 5,231,747 | 8/1993 | Clark et al. | 29/243 |
| 5,299,894 | * 4/1994 | McCowin | 408/1 R |
| 5,332,341 | 7/1994 | Arai et al. | 408/61 |
| 5,458,443 | 10/1995 | Belge et al. | 408/35 |
| 5,669,867 | * 9/1997 | Hoppe | 408/234 |
| 5,765,975 | 6/1998 | Hoffmann et al. | 409/138 |
| 5,848,859 | 12/1998 | Clark et al. | 408/1 |

* cited by examiner

Primary Examiner—Valencia Martin-Wallace
Assistant Examiner—Erica D. Ergenbright
(74) Attorney, Agent, or Firm—Terry J. Anderson; Karl J. Hoch, Jr.

(57) ABSTRACT

A vibration-absorbing end effector of an automated drill and countersink machine having a shock to mitigate communications of vibrations to the drill tool, while simultaneously dampening the vibrations at their source, in order to increase control of a drill tool during drilling and countersinking operations. The end effector comprises a measurement scale to ensure that the depths of holes to be drilled and countersunk can be checked and corrected in accordance with corresponding ideal depths stored in a memory of the computer already interfaced to the end effector. Furthermore, the pressure foot of the end effector is upwardly rotatable to access the drill tool to the chuck.

51 Claims, 3 Drawing Sheets

VIBRATION-ABSORBING END EFFECTOR OF AN AUTOMATED DRILL AND COUNTERSINK MACHINE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to an end effector for an automated drill and countersink machine, and more particularly to an improved end effector with a shock that mitigates the communication of vibrations to the attached drill tool of the drill and countersink machine in order to increase control of the tool during drilling and countersinking operations.

End effectors are well known and in wide use throughout the aerospace industry as well as other industries. During the assembly of aircraft structures, and in particular during airframe assembly, considerable difficulties may be encountered because various operations, such as drilling and countersinking, need to be performed to extremely fine tolerances.

While various components of the aircraft structure, and in particular the airframes, may constitute a unit durable to considerable stresses once assembly is completed, these individual components may be extremely fragile and need to be handled with great care before assembly.

Various assembly operations, such as drilling and countersinking, may need to be performed to extremely fine tolerances. For example, drilling and countersinking operations may require extreme precision, with tolerances of approximately 20–30 microns in the countersinking depth. The meticulous precision mandated by these operations may impose great difficulties, especially in an industry that depends heavily on mass production. However, these operations may need to be performed with the greatest precision to achieve the highest technological standards possible.

In the past, manual technology was used to conform to the necessary precision required by the drilling and countersinking operation. However, manual drilling and countersinking proved to be a labor intensive process that was carried out one hole at a time. The work was extremely tedious and yet at the same time required a highly skilled operator to consistently produce quality results, and highly skilled quality control inspectors to insure that all the drilled and countersunk holes were flawlessly compatible to corresponding fasteners to meet the specifications of flushness, interference and button formation. These personnel costs substantially increased the costs of the operation and tended to increase the overall expenses of a completed airplane.

The manual process of drilling and countersinking a hole was ready to be replaced by automation, and attempts have been made for many years to obtain the benefits of increased capacity and quality while reducing costs and rework. However, attempts to develop automated drilling and countersinking machines have been hampered by a multitude of practical problems that interfere with the smooth operation of an automated system, resulting in a requirement for continual manual intervention by skilled operators.

Typical automated drill and countersink machines have end effectors that assist in drilling a hole into a workpiece surface as specified by the operator. Although current automated drill and countersink machines are somewhat precise, this particular type of job may require extreme precision, with tolerances of approximately 20–30 microns in the countersinking depth.

Great difficulty may be encountered in achieving such consistent precision due to the vibrations generated by the automated drill and countersink machine when in operation. The end effector is especially susceptible to heavy vibrations because it is the only component of the drill and countersink machine that is in contact with the workpiece surface when the attached drill tool is drilling a hole in the surface. In addition, the automated drill and countersink machine is further subject to vibrations produced by the other components of the machine. Therefore, the attached drill tool of the machine may be exposed to these vibrations, and thus affect the controllability of the tool to carry on an effective drilling and countersinking operation.

The end effector comprises a pressure foot adapted to engage the workpiece surface. Once engaged to the workpiece surface, a rotating chuck attached to the automated drill and countersink machine translates toward the workpiece surface in order to drill and countersink. The impact of the drill tool against the surface during drilling and countersinking operations produces heavy vibrations, which are transferred to the engaged pressure foot. The pressure foot vibrates heavily in response to such transfer from the resulting impact of the drilling and countersinking procedure.

In addition, a spindle motor attached to the automated drill and countersink machine is operative to generate heavy vibrations due to its natural function of producing power to the spindle. The spindle motor is the source of power necessary for the drill and countersink machine to carry out its function. Because the spindle motor supplies kinetic energy to various components of the machine, the spindle motor is in a constant state of motion, thereby producing heavy vibrations in the process.

Thus, there has long been a need in the industry, and in the airframe manufacturing business in particular, for a method and an apparatus for mitigating communication of vibrations to an attached drill tool arising in the process of drilling and countersinking a hole to the required tolerances. In particular, there is a need to eliminate the vibrations generated from the spindle motor and the pressure foot in order to reduce the overall vibrations of the drill and countersink machine.

The present invention addresses and overcomes the above-described deficiency of prior art automated drill and countersink machine by providing a vibration-absorbing end effector wherein a shock is attached to the pressure foot and the pressure foot frame of the end effector. Moreover, the shock may also be attached to the pressure foot and the spindle motor of the machine to mitigate communication of the vibrations to the attached drill tool. In the present end effector of the automated drill and countersink machine, the shock mitigates the communication of vibrations thereby reducing the overall vibration of the machine and increasing control of the drill tool during drilling and countersinking operations. In this respect, not only does the shock mitigate the communications of vibrations generated to the attached tool of the machine, but it also dampens the vibrations at their source.

BRIEF SUMMARY OF THE INVENTION

In accordance with a preferred embodiment of the present invention, there is provided a vibration-absorbing end effector for an automated drill and countersink machine for mitigating communication of vibrations to an attached drill tool when drilling a hole in a workpiece surface. The end effector of the preferred embodiment comprises a pressure foot adapted to engage the workpiece surface, wherein the pressure foot is receivable of the vibrations when engaged to the workpiece surface.

Connected to the pressure foot is a pressure foot frame receivable of the vibrations from the pressure foot. In addition, the end effector further comprises a shock having a first end and a second end. The first end is coupled to the pressure foot and the second end is coupled to the pressure foot frame. The shock mitigates communication of the vibrations to the attached drill tool in order to increase control of the tool during drilling and countersinking operations.

In accordance with a preferred embodiment of the present invention, the shock attached to the pressure foot and the pressure foot frame is a gas shock. Moreover, the shock is adjustable to apply pressure on the workpiece surface. In addition, the shock first end has a shaft and a first coupling, wherein the first coupling is pivotally attached to the pressure foot. Furthermore, the shock second end has a second coupling, wherein the second coupling is pivotally attached to the pressure foot frame.

In the preferred embodiment, the pressure foot of the vibration-absorbing end effector is rotatably attached to the pressure foot frame. Furthermore, the pressure foot is upwardly rotatable 90 degrees to access the drill tool to the drill and countersink machine. The preferred embodiment further comprises a pressure foot stop operative to position the pressure foot at the end of the upward rotation. Moreover, the pressure foot further comprises a double acting gas spring that applies continuous pressure throughout the arc of motion of the pressure foot. The pressure foot further has a pressure foot cap removably attached to the pressure foot, wherein the pressure cap is adapted to engage the workpiece surface.

The vibration-absorbing end effector of the preferred embodiment further comprises an end effector mount having a beam engager, wherein the mount is attached to the drill and countersink machine. Moreover, the end effector further comprises a slidable beam disposed between the pressure foot frame and the end effector mount having the beam engager. The slidable beam has a top portion and a bottom portion, wherein the beam top portion is engaged to the pressure foot frame and the beam bottom portion is engaged to the beam engager of the mount. More specifically, the beam engager of the end effector mount is slidably engaged to the bottom portion of the slidable beam, wherein the engager of the mount is slidably translatable along the beam towards the workpiece surface.

The vibration-absorbing end effector of the preferred embodiment further comprises a measurement scale having a first end and a second end. The scale first end is attached to the pressure foot frame and the scale second end is attached to the drill and countersink machine. The measurement scale may be a sealed electronic scale. More specifically, the scale first end has a measurement scale shaft and a measurement scale stop, wherein the scale stop is attached to the pressure foot frame. The measurement scale stop further comprises an aperture, wherein the aperture is configured to slidably engage the measurement scale shaft. The measurement scale is operative to take measurements as the scale shaft slidably translates through the aperture towards the workpiece surface. Furthermore, the measurement scale is activated when the pressure foot engages the workpiece surface.

In accordance with a preferred embodiment of the present invention, the vibration-absorbing end effector further comprises a computer in communication with the measurement scale. The measurements taken by the scale are transmitted to the computer, wherein the computer is operative to convert the measurements into machine operations data. Moreover, the computer is operative to share and exchange machine operations data with the drill and countersink machine having the drill tool, wherein the machine operations data consists of speeds, measurements, feeds, and control of depths of the drill tool. Furthermore, the computer is in operational communication with the drill and countersink machine.

In addition to the preferred embodiment of the present invention, the shock may also be attached to an automated drill and countersink machine for mitigating communications of drill and motor vibrations to an attached drill tool when drilling a hole to a controlled-depth in a workpiece surface. The automated drill and countersink machine of the preferred embodiment comprises a spindle motor being operative to generate motor vibrations when in operation.

Mechanically connected to the spindle motor is a pressure foot receivable of drill vibrations when engaged to the workpiece surface. Moreover, the machine further comprises a shock having a first end and a second end, wherein the shock first end is coupled to the pressure foot and the shock second end is coupled to the spindle motor. The shock mitigates communication of the drill and motor vibrations to the attached drill tool in order to increase control of the tool during drilling and countersinking operations.

In addition, the shock first end further comprises a shaft and a first coupling pivotally attached to the pressure foot. Moreover, the spindle motor further comprises a spindle motor housing. The shock second end has a second coupling pivotally attached to the spindle motor housing.

In accordance with a preferred embodiment of the present invention, the machine comprises a chuck in mechanical communication with the spindle motor that translates toward the workpiece surface, wherein the chuck is configured to attach the drill tool. Moreover, the machine further comprises a spindle disposed between the chuck and the spindle motor, wherein the spindle and the spindle motor are jointly operative to rotate the chuck. More specifically, the spindle motor rotates the spindle, and the spindle simultaneously rotates the chuck. The chuck has a chuck housing.

The machine has a chuck guide in rotational communication with the chuck for aligning the chuck along the axis of motion. In addition, the end effector mount having a beam engager is attached to the chuck guide.

Moreover, the pressure foot has a front surface and a back surface. The pressure foot front surface is adapted to engage the workpiece surface and the pressure foot back surface is aligned with the chuck guide to translate the chuck along the axis of motion.

In accordance with a preferred embodiment of the present invention, the machine comprises a measurement scale having a first end and a second end. The scale first end is attached to the pressure foot frame and the scale second end is attached to the chuck casing.

In addition, a computer is further operative to transmit tooling operational commands to the drill and countersink machine having the drill tool. The tooling operational commands consist of spindle start and stop, spindle forward and reverse, speeds, and feeds.

In accordance with a preferred embodiment of the present invention, the vibration-absorbing automated drill and countersink machine further comprises a method of mitigating communications of drill and motor vibrations to an attached tool of the machine defined by a spindle motor, a chuck, a pressure foot, and a shock. The preferred embodiment comprises the method of moving the drill and countersink machine towards the workpiece surface along an axis of motion. Then, operating the spindle motor, wherein the spindle motor is operative to generate motor vibrations when in operation.

The method further comprises engaging the pressure foot against the workpiece surface, wherein the pressure foot is receivable of the drill vibrations when engaged to the workpiece surface. Next, translating and rotating the chuck towards the workpiece surface along the axis of motion. Finally, absorbing the drill and the motor vibrations with the shock to mitigate communications of the drill and motor vibrations to the attached drill tool in order to increase control of the tool during drilling and countersinking operations.

BRIEF DESCRIPTION OF THE DRAWINGS

These as well as other features of the present invention, will become more apparent upon reference to the drawings wherein.

DETAILED DESCRIPTION OF THE INVENTION

Figure 1:
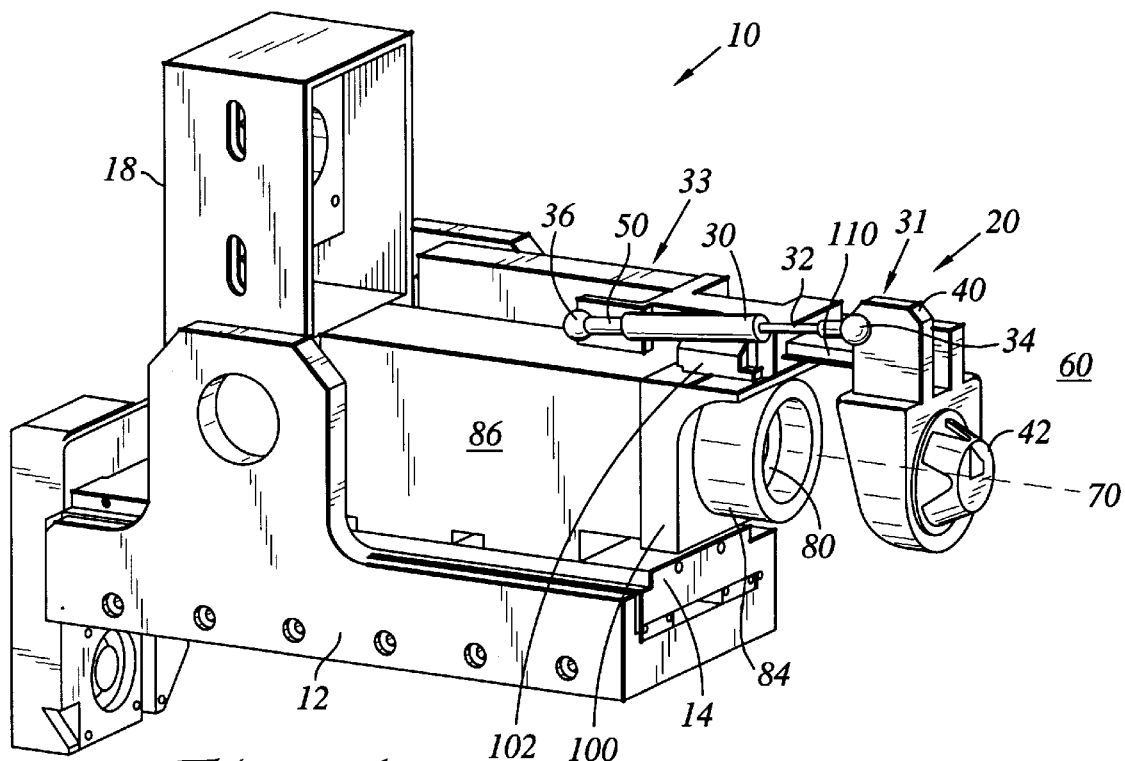
FIG. 1 is a perspective view of a vibration-absorbing end effector for an automated drill and countersink machine constructed in accordance with a preferred embodiment of the present invention and including a shock attached to the pressure foot and the pressure foot frame.

Referring now to the drawings wherein the showings are for purposes of illustrating a preferred embodiment of the present invention only, and not for purposes of limiting the same, FIG. 1 perspectively illustrates a vibration-absorbing end effector 20 for an automated drill and countersink machine 10 constructed in accordance with a preferred embodiment of the present invention. The end effector 20 includes a shock 30 attached to a pressure foot 40 and a pressure foot frame 50. For clarity, the section of a particular component of the end effector 20 that faces a workpiece surface 60 when drilling and countersinking in the surface 60 constitutes the anterior, or the front, portion, whereas its opposite section is the posterior, or the back, portion.

The automated drill and countersink machine 10 comprises a lower support base 12. Attached to the support base 12 via a support floor 14 is a chuck housing 86. The support floor 14 is translatable towards and away from the workpiece surface 60.

More specifically, the support floor 14 has a top surface attached to the chuck housing 86 and a bottom surface attached to the support base 12. The bottom surface of the support floor 14 is slidably engaged to the support base 12 such that the support floor 14 with the chuck housing 86 fixed on the top surface thereof is translatable towards the workpiece surface 60 relative to the stationary support base 12.

The support floor 14 further comprises a support member 18 extending perpendicularly upward from the top surface of the support floor 14. The support member 18 is positioned at the posterior section of the support floor 14 behind the posterior portion of the chuck housing 86.

Figure 4:
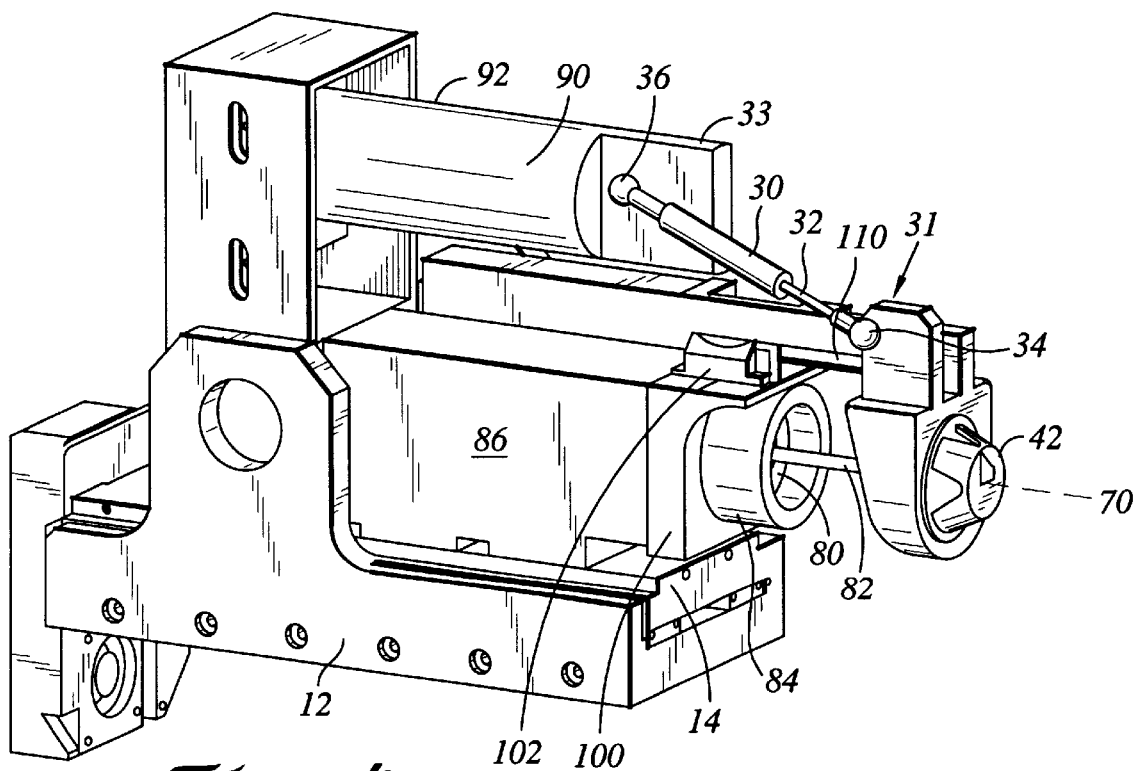
FIG. 4 is a perspective view of a vibration-absorbing end effector of an automated drill and countersink machine constructed in accordance with a preferred embodiment of the present invention and including a shock attached to the pressure foot and the spindle motor.

Referring now to FIG. 4, a spindle motor 90 is enclosed within a spindle motor housing 92. The spindle motor housing 92 is mechanically attached to the top portion of support member 18 and envelopes the spindle motor 90. The attachment of the spindle motor housing 92 to the support member 18 may be facilitated by any kind of fasteners, such as screws or rivets. The support member 18 can be fabricated from any metallic material, preferably stainless steel.

The spindle motor 90 mechanically rotates and translates a chuck 80. Therefore, the spindle motor 90 is operative to generate heavy vibrations in the process and is susceptible to these generated vibrations when in operation.

The spindle motor 90 mechanically operates the chuck 80 that is sized and configured to translate towards the workpiece surface 60. The chuck 80 has an aperture at its anterior end to allow access of a drill tool 82. The drill tool 82 enters the chuck 80 through its aperture until properly attached to the chuck 80 at its posterior end.

A chuck housing 86 embodied as the middle portion of the drill and countersink machine 10 encloses the chuck 80. The chuck housing 86 is fabricated from any metallic material, preferably stainless steel. The front side of the chuck housing 86 is partially open to allow the chuck 80 to protrude through a fitted opening. The bottom surface of the chuck housing 86 is attached to the support floor 14. Therefore, as the support floor 14 translates with respect to the stationary support base 12 along the axis of motion, the affixed chuck housing 86 moves with the support floor 14.

The chuck guide 84 prevents the attached drill tool 82 from diverting away while the chuck 80 is being translated via the support floor 14 towards the workpiece surface 60. The chuck guide 84 has a diameter greater than the chuck 80 and is further in coaxial alignment with the chuck 80. More specifically, the chuck guide 84 surrounds the protruded anterior edges of the chuck 80. The chuck guide 84 is further in rotational communication with the chuck 80.

Figure 2:
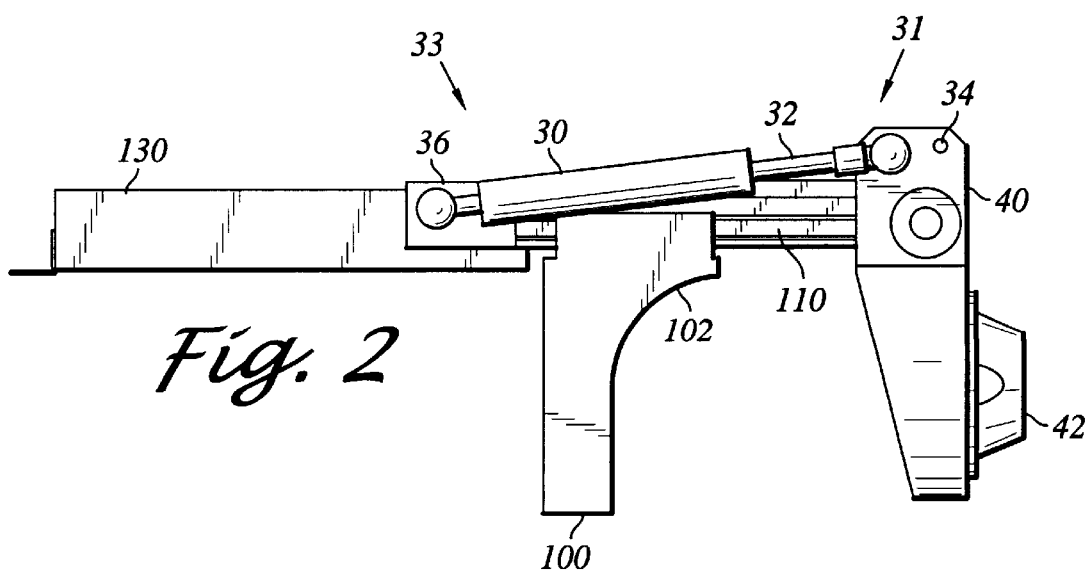
FIG. 2 is a side plan view of a vibration-absorbing end effector shown in FIG. 1.

Referring now to FIG. 2, in accordance with the preferred embodiment of the present invention, the end effector 20 for the automated drill and countersink machine 10 comprises an end effector mount 100 adapted to surround the chuck guide 84. More specifically, the end effector mount 100 has an aperture that is fitted around the chuck guide 84. In addition, the mount 100 further comprises a beam engager 102 placed on its top surface.

The end effector 20 further comprises a pressure foot frame 50. Disposed between the beam engager 102 and the pressure foot frame 50 is a slidable beam 110. The slidable beam 110 has a top portion mechanically engaged to the pressure foot frame 50. A bottom portion of the slidable beam 110 is engaged to the beam engager 102 of the end effector mount 100. More specifically, the bottom portion of beam 110 is slidably engaged to the beam engager 102, wherein the engager 102 of the mount 100 is translatable along the beam 110 towards the workpiece surface 60. Therefore, as the support floor 14 having the affixed chuck housing 86 moves with respect to the stationary support base 12 towards the workpiece surface 60, the beam engager 102 of the mount 100 mechanically attached to the chuck housing 86 may also translate with the chuck housing 86 and the support floor 14 by sliding along the slidable beam 102.

Referring to FIGS. 1, 2, 4, and 5, the pressure foot 40 of the vibration-absorbing end effector 20 is rotatably attached to the pressure foot frame 50. Moreover, the pressure foot is upwardly rotatable in relation to the stationary pressure foot frame 50 to access the drill tool 82 to the chuck 80, preferably 90 degrees. Furthermore, the pressure foot 40 is positioned at the end of its upward rotation by means of a stop. In addition, the pressure foot 40 further comprises a double acting gas spring that applies continuous pressure throughout the arc of motion of the pressure foot 40.

The pressure foot 40 is further defined by a front surface and a back surface. The front surface is adapted to engage the workpiece surface 60. More specifically, the front surface of pressure foot 40 comprises a pressure foot cap 42 removably attached to the front surface of the pressure foot 40 in order to prevent scarring on the workpiece surface 60 when engaged to the surface 60. Accordingly, the pressure foot cap 42 can be fabricated from any non-scarring materials, preferably rubber or plastic.

The front surface of the pressure foot 40 engages a small area of the workpiece surface 60 closely surrounding the drill and countersink point. The back surface is linearly aligned with the chuck guide 84 to translate the chuck 80 along the axis of motion 70. Once engaged to the workpiece surface 60, the support floor 14 translates toward the surface 60. As discussed, the affixed chuck casing 86 with the chuck 80 moves with the support floor 14. While the support floor 14 is carrying the chuck housing 86 towards the surface 60, the rotating chuck 80 is translating with the support floor 14 and the chuck housing 86 towards the workpiece surface 60 until the attached drill tool 82 contacts the surface 60 through the centered aperture in the pressure foot 40. The impact from drilling and countersinking produces heavy vibrations, which transfer to the engaged pressure foot 40. The pressure foot 40 vibrates heavily in response to such transfer of vibrations resulting from the impact of the drill tool 82 against the workpiece surface 60 during drilling and countersinking operations.

Figure 3:
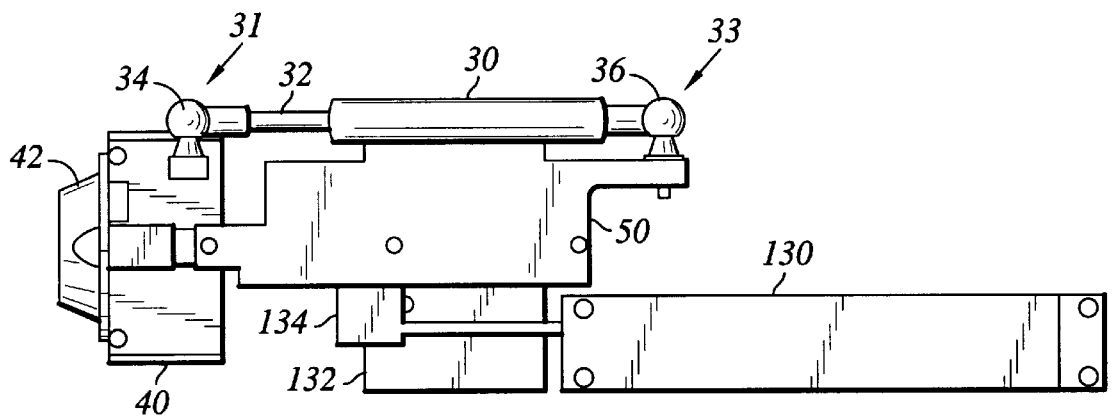
FIG. 3 is a top view of the end effector shown in FIG. 1.

Referring now to FIGS. 2 and 3, the vibration-absorbing end effector 20 of an automated drill and countersink machine 10 further comprises a shock 30 having a first end 31 and a second end 33. The first end of the shock 30 has a shaft 32 and a first coupling 34. The first coupling 34 is pivotally attached to the upper portion of the pressure foot 40. The second end of the shock 30 has a second coupling 36 pivotally attached to the posterior section of the pressure foot frame 50.

As stated, the impact from drilling and countersinking produces heavy vibrations. Because the pressure foot 40 is engaged to the surface 60, the resulting vibrations are transferred to the engaged pressure foot 40. The pressure foot 40 vibrates heavily in response to such transfer of vibrations resulting from the impact of the drill tool 82 against the surface 60. Consequently, the vibrations are further transferred to the pressure foot frame 50 and the drill tool 82 thereby hindering effective precise drilling and countersinking operations.

In order to alleviate this problem, the shock 30 is attached to the pressure foot 40 and the pressure foot frame 50 as specified above. The shock mitigates the communication of drilling vibrations to the drill tool 82 in order to increase control of the tool 82 during drilling and countersinking operations. More specifically, the shock 30 absorbs and mitigates the communication of vibrations travelling through the end effector 20 at its respective points of attachment, the pressure foot 40 and the pressure foot frame 50. By doing so, the shock 30 mitigates the communication of vibrations to the drill tool 82 by diluting the vibrations at the pressure foot 40 and the pressure foot frame 50. Consequently, the diluted vibrations are then communicated to the drill tool 82 through the slidable beam 110, the mount 100 having the engager 102, the chuck guide 84, and the chuck 80, respectively. The mitigated vibrations reach the drill tool 82 attached to the chuck 80 in its diluted form, thereby substantially negating the vibrations at the drill tool 82 during drilling and countersinking operations. In this respect, not only does the shock 30 mitigate the communication of vibrations generated to the attached tool 82, but it also dampens the vibrations at its points of attachments.

Figure 5:
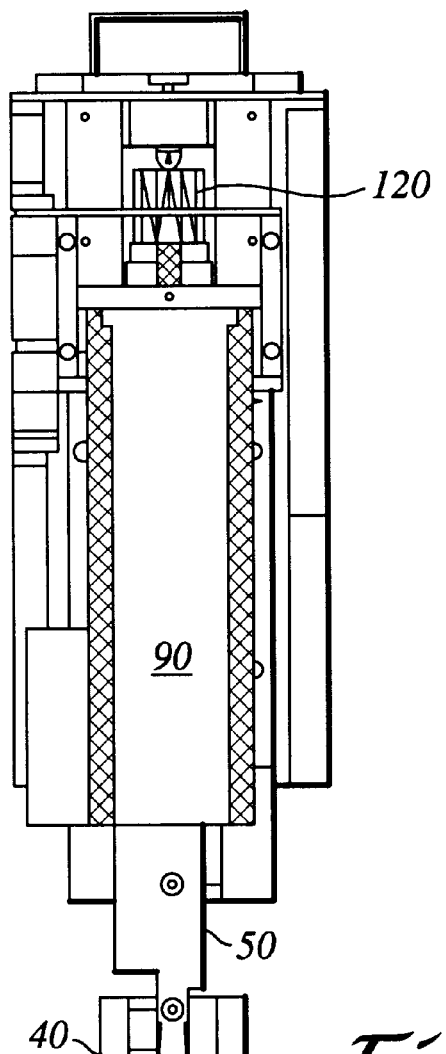
FIG. 5 is a top view of the end effector and spindle motor shown in FIG. 4.

Referring now to FIGS. 4 and 5, the points of attachment of the shock 30 may vary than that of above. In addition to the shock 30 as described above, the shock may also be attached to the pressure foot 40 and the spindle motor housing 92. The first coupling 34 is attached to the upper portion of the pressure foot 40 and the second coupling is attached to the anterior portion of the spindle motor housing 92.

The attached shock 30 absorbs the steady flow of vibrations from the pressure foot 40 and the spindle motor 90. By absorbing the generated vibrations, the shock 30 reduces the overall vibrations of the end effector 20 by neutralizing the respective vibrations at its origin in order to increase control of the drill tool during drilling and countersinking operations. In this respect, not only is the shock 30 absorbing the vibrations generated from the pressure foot 40 and the spindle motor 90, but it also mitigates the communication of vibrations from the pressure foot 40 and the spindle motor 90 to other components of the drill and countersink machine 10 by dampening the vibrations at their source.

As stated, the first end of the shock 30 is attached to the upper portion of the pressure foot 40. The shock 30 mitigates the communication of drill vibrations flowing through the pressure foot 40 to other components of the end effector 20 of a drill and countersink machine 10 in order to increase control of the drill tool 82 during drilling and countersinking operations. When the pressure foot 40 is engaged to the workpiece surface 60, the heavy vibrations generated from the repetitive contact of the drill tool 82 against the workpiece surface 60 transfers to the pressure foot 40. The pressure foot 40 vibrates heavily in response to such transfer from the resulting impact of the drill tool 82 against the workpiece surface 60. The attached shock 30 mitigates the transferred vibrations at the pressure foot 40. By doing so, the shock 30 mitigates the communication of vibrations travelling through the end effector 20 via the pressure foot frame 50, slidable beam 110, and end effector mount 100 having the beam engager 102. The mitigated vibrations communicated to the end effector mount 100 is diluted, whereby the vibrations are then conveyed to the chuck guide 84 attached to the chuck 80. The vibrations then travel to the chuck 80 via a chuck guide 84. Consequently, the mitigated vibrations reach the drill tool 82 attached to the chuck 80 in its diluted form, thereby substantially negating the vibrations at the drill tool 82 during drilling and countersinking operations.

The second end of the shock 30 is attached to the spindle motor housing 92. The shock 30 mitigates the communication of vibrations generated from the spindle motor to other components of the machine 10 in order to increase control of the drill tool 82 during drilling and countersinking operations. The spindle motor 90 is mechanically communicated to supply kinetic energy to rotate and translate the chuck 80 having an attached drill tool 82, thus being in a constant state of motion when the actual drilling and countersinking takes place. For this reason, the spindle motor 90 generates heavy vibrations in the process. The attached shock 30 mitigates the vibrations generated from the spindle motor 90. By doing so, the shock 30 mitigates the communication of vibrations travelling to the attached spindle 120 also connected to the chuck 80. The mitigated vibrations communicated to the spindle 120 is diluted, whereby the vibrations are then conveyed to the chuck 80. Consequently, the mitigated vibrations reach the drill tool 82 attached to the chuck 80 in its diluted form, thereby substantially negating the vibrations at the drill tool 82 during drilling and countersinking operations.

The shock 30, as described above, may be any type of shock to mitigate the vibrations that reach the drill tool 82. However, a gas shock is preferred. The use of the gas shock is preferred with the present invention because the compression dampening effect will counteract the vibrations generated from the drilling operation and the spindle motor 90.

Furthermore, the shock 30 may be adjustable to apply pressure on the workpiece surface 60. The shock 30 should exert sufficient force to counteract the weight of the pressure foot 40 to retain the pressure foot 40 against the workpiece surface 60 as the chuck 80 having an attached drill tool 82 repetitively drills on the surface 60. The pressure foot 40 may vibrate in response to the motion of the drill tool 82 working against the workpiece surface 60. The shock 30 can be adjustable to apply proper pressure on the pressure foot 40 to negate the movement caused by the motion of the drill tool 82 against the workpiece surface 60.

Referring now to FIG. 3, the vibration-absorbing end effector 20 of an automated drill and countersink machine 10 may further comprise a measurement scale 130, such as a sealed electronic scale, having a first end and a second end. The first end of the measurement scale 130 is attached to the pressure foot frame 50. More specifically, the first end has a measurement scale shaft 132 and a measurement scale stop 134, wherein the measurement scale stop 134 is attached to the pressure foot frame 50. The measurement scale stop 134 is configured to slidably engage the measurement scale shaft 132. Furthermore, the second end of the measurement scale 130 is attached to the chuck housing 86.

Figure 6:
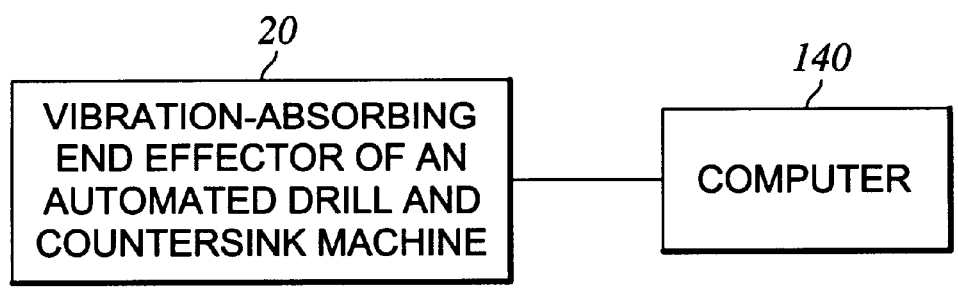
FIG. 6 is a block diagram portraying the interaction of the end effector with a computer.

Referring now to FIGS. 3 and 6, the measurement scale 130 ensures that the depths of holes on a workpiece surface 60 and more specifically, the depths of holes to be drilled and countersunk can be checked and corrected in accordance with corresponding ideal depths stored in a memory of a computer 140 already interfaced to the end effector 20. The measurement scale 130 is activated when the pressure foot 40 engages the workpiece surface 60.

When the pressure foot 40 is engaged to the workpiece surface 60, the support floor 14 carrying the chuck casing 86 translates towards the workpiece surface 60 along the axis of motion 70 via the slidable beam 110 until the desired drill depth is reached. As the chuck casing 86 translates toward the workpiece surface 60, the attached measurement scale 130 simultaneously moves with the chuck housing 86. More specifically, the measurement scale 130 detects the movement of the chuck housing 86 because the measurement scale shaft 132 of the scale 130 is slidably translatable through the scale stop 134. The measurement scale 130 is operative to take measurements as the scale shaft 132 slidably translates through the aperture of the scale stop 134 towards the workpiece surface 60. The measurements are then integrated with the interfaced computer 140.

FIG. 5 portrays a spindle 120 disposed between the spindle motor 90 and the chuck 80. More specifically, the spindle motor 40 can rotate the spindle 120, wherein the spindle motor 40 and the spindle 120 are jointly operative to rotate the chuck 80. The chuck 80 attached to the spindle 120 rotates in response to the spindle 120, wherein the spindle 120 receives the kinetic energy necessary for such motion from the power generated by the spindle motor 90.

Referring to FIG. 6, the vibration-absorbing end effector 20 of an automated drill and countersink machine 10 is interfaced to a computer 140. More specifically, the measurement scale 130 is integrated to the computer 140. The measurements taken by the scale 130 are transmitted to the computer 140, wherein the computer 140 is operative to convert the measurements into machine operations data. In addition, the computer 140 is further operative to share and exchange machine operations data with the drill and countersink machine 10, wherein the machine operations data consists of speeds, measurements, feeds, and control of depths of the drill tool 82. In other words, the measurement scale 130 of the end effector 20 relays measurements to the computer 140, wherein the computer 140 interprets such measurements in order to output a feedback to the automated drill and countersink machine 10. The machine 10 relies on these feedback to properly coordinate the drilling and countersinking operations. In addition, the computer 140 can further be in operational communication to transmit tooling operational commands to the machine 10, wherein the tooling operational commands consist of spindle start and stop, spindle forward and reverse, speeds, and feeds.

Additional modifications and improvements of the present invention may also be apparent to those of ordinary skill in the art. Thus, the particular combination of parts described and illustrated herein is intended to represent only certain embodiments of the present invention, and is not intended to serve as limitations of alternative devices within the spirit and scope of the invention.

What is claimed is:

1. A vibration-absorbing end effector for an automated drill and countersink machine that mitigates communication of vibrations to an attached tool having a tool axis when drilling a hole in a workpiece surface, the end effector comprising:

a pressure foot resiliently engageable to the workpiece surface, the pressure foot vibrating in response to receiving the communication of vibrations when drilling the workpiece surface;

a pressure foot frame connected to the pressure foot, the pressure foot frame vibrating in response to receiving the communication of vibrations from the pressure foot; and a resilient shock having a first end and a second end, the shock first end being pivotally coupled to the pressure foot, the shock second end being coupled to the pressure foot frame, the shock having longitudinal axis that is generally parallel to the tool axis, wherein the shock mitigates the communication of the vibrations flowing from the pressure foot to the pressure foot frame to dampen the communication of the vibrations to the attached drill tool in order to increase control of the tool.

2. The invention as set forth in claim 1 wherein the shock is a gas shock.

3. The invention as set forth in claim 1 wherein the shock is adjustable to apply pressure on the workpiece surface.

4. The invention as set forth in claim 1 wherein the shock first end further comprises a shaft and a first coupling, the first coupling being pivotally attached to the pressure foot.

5. The invention as set forth in claim 1 wherein the shock second end further comprises a second coupling, the second coupling being pivotally attached to the pressure foot frame.

6. The invention as set forth in claim 1 wherein the pressure foot is rotatably attached to the pressure foot frame.

7. The invention as set forth in claim 6 wherein the pressure foot further comprises a pressure foot cap removably attached to the pressure foot, the pressure foot cap being engageable to the workpiece surface.

8. The invention as set forth in claim 6 wherein the pressure foot is rotatable with respect to the pressure foot frame to access the drill tool to the drill and countersink machine.

9. The invention as set forth in claim 8 wherein the pressure foot is rotatable 90 degrees with respect to the Pressure foot frame.

10. The invention as set forth in claim 1 wherein the end effector further comprises a measurement scale having a first end and a second end, the scale first end being attached to the pressure foot frame, the scale second end being attached to the drill and countersink machine.

11. The invention as set forth in claim 10 wherein the measurement scale is a sealed electronic scale.

12. The invention as set forth in claim 10 wherein the scale first end has a measurement scale shaft and a measurement scale stop, the scale stop being attached to the pressure foot frame.

13. The invention as set forth in claim 12 wherein the measurement scale stop is slidably engage the measurement scale shaft.

14. The invention as set forth in claim 13 wherein the measurement scale is operative to measure translation of the scale shaft toward the workpiece surface the translation of the scale shaft being representative of depth of drill in the workpiece.

15. The invention as set forth in claim 14 further comprising a computer in communication with the measurement scale.

16. A vibration-absorbing automated drill and countersink machine for mitigating communication of drill and motor vibrations to an attached drill tool when drilling a hole to a controlled depth in a workpiece surface, the machine comprising:

a housing having a spindle motor, the spindle motor being operative to generate the motor vibrations when in operation;

a pressure foot in mechanical communication with the spindle motor, the pressure foot vibrating in response to the drill vibrations generated when drilling the workpiece surface; and a gas shock having a first end and a second end, the gas shock first end being attachable to the pressure foot, the gas shock second end being pivotally attachable to the housing, wherein the shock mitigates communication of the drill and the motor vibrations to the attached drill tool in order to increase control of the tool.

17. The invention as set forth in claim 16 wherein the shock is adjustable to apply pressure on the workpiece surface.

18. The invention as set forth in claim 16 wherein the shock first end further comprises a shaft and a first coupling, the first coupling being pivotally attached to the pressure foot.

19. The invention as set forth in claim 16 wherein the shock second end further comprises a second coupling, the second coupling being pivotally attached to the housing.

20. The invention as set forth in claim 16 wherein the machine further comprises a chuck in mechanical communication with the spindle motor, the chuck and the spindle motor being translatable towards the workpiece surface, the chuck further being configured to attach the drill tool.

21. The invention as set forth in claim 20 wherein the machine further comprises a spindle disposed between the chuck and the spindle motor, wherein the spindle and the spindle motor are jointly operative to rotate the chuck.

22. The invention as set forth in claim 21 wherein the spindle motor rotates the spindle, and the spindle rotates the chuck.

23. The invention as set forth in claim 21 wherein the chuck further comprises a chuck housing.

24. The invention as set forth in claim 23 wherein the machine further comprises a chuck guide in rotational communication with the chuck.

25. The invention as set forth in claim 24 wherein the machine further comprises an end effector mount having a beam engager, the mount being attached to the chuck guide.

26. The invention as set forth in claim 25 wherein the machine further comprises a pressure foot frame, the pressure foot frame being attached to the pressure foot.

27. The invention as set forth in claim 26 wherein the pressure foot is rotatably attached to the pressure foot frame.

28. The invention as set forth in claim 27 wherein the pressure foot further comprises a pressure foot cap removably attached to the pressure foot, the pressure foot cap being engageable to the workpiece surface.

29. The invention as set forth in claim 27 wherein the pressure foot is rotatable with respect to the pressure foot frame to access the drill tool to the chuck.

30. The invention as set forth in claim 29 wherein the pressure foot is rotatable 90 degrees with respect to the pressure foot frame.

31. The invention as set forth in claim 26 wherein the pressure foot has a front surface and a back surface, the pressure foot front surface being engageable to the workpiece surface, the pressure foot back surface being aligned with the chuck guide to translate the chuck towards the workpiece surface.

32. The invention as set forth in claim 26 wherein the machine further comprises a measurement scale having a first end and a second end, the scale first end being attached to the pressure foot frame, the scale second end being attached to the chuck casing.

33. The invention as set forth in claim 32 wherein the measurement scale is a sealed electronic scale.

34. The invention as set forth in claim 32 wherein the scale first end has a measurement scale shaft and a measurement scale stop, the scale stop attached to the pressure foot frame.

35. The invention as set forth in claim 34 wherein the measurement scale stop slidably engage the measurement scale shaft.

36. The invention as set forth in claim 35 wherein the measurement scale is operative to measure translation of the scale shaft toward the workpiece surface, the translation of the scale shaft being representative of depth of drill in the workpiece.

37. The invention as set forth in claim 36, further comprising a computer in communication with the measurement scale.

38. The invention as set forth in claim 37 wherein the computer is operative to share and exchange machine operations data with the drill and countersink machine having the drill tool.

39. The invention as set forth in claim 38 wherein the machine operations data comprise speeds, measurements, feeds, and control of depths of the drill tool.

40. The invention as set forth in claim 38 wherein the computer is further operative to transmit tooling operational commands to the drill and countersink machine having the drill tool.

41. The invention as set forth in claim 40 wherein the tooling operational commands comprise spindle start and stop, spindle forward and reverse, speeds, and feeds.

42. A vibration-absorbing automated drill and countersink machine for mitigating communications of drill and motor vibrations to an attached drill tool when drilling a hole to a controlled depth in a workpiece surface, the machine comprising:
- a spindle motor operative to generate the motor vibrations when in operation;
- a pressure foot in mechanical communication with the spindle motor, the pressure foot vibrating in response to the drill vibrations generated when drilling the workpiece surface; and
- a gas shock having a first end and a second end, the gas shock first end being pivotally attachable to the pressure foot, the gas shock second end being attachable to the spindle motor, wherein the shock mitigates communication of the drill and motor vibrations to the attached drill tool in order to dampen vibrations thereat for increasing control of the tool.

43. The machine of claim 42 wherein the shock first end comprises a shaft with a first coupling, the first coupling being pivotally attachable to the pressure foot.

44. The machine of claim 42 wherein the shock is adjustable to apply pressure on the workpiece surface.

45. (New) A vibration-absorbing automated drill and countersink machine for mitigating communication of drill and motor vibrations to an attached drill tool when drilling a hole to a controlled depth in a workpiece surface, the machine comprising:
- a housing having a spindle motor, the spindle motor being operative to generate the motor vibrations when in operation;
- a pressure foot in mechanical communication with the spindle motor, the pressure foot vibrating in response to the drill vibrations generated when drilling the workpiece surface; and
- a shock having a first end and a second end, the shock first end including a shaft and a first coupling, the first coupling of the shock first end being pivotally attached to the pressure foot, the shock second end being attached to the housing, wherein the shock mitigates communication of the drill and the motor vibrations to the attached drill tool in order to increase control of the tool.

46. The invention as set forth in claim 45 wherein the shock is a gas shock.

47. The invention as set forth in claim 45 wherein the shock is adjustable to apply pressure on the workpiece surface.

48. The invention as set forth in claim 45 wherein the shock second end further comprises a second coupling, the second coupling being pivotally attached to the housing.

49. A vibration-absorbing automated drill and countersink machine for mitigating communications of drill and motor vibrations to an attached drill tool when drilling a hole to a controlled depth in a workpiece surface, the machine comprising:
- a spindle motor operative to generate the motor vibrations when in operation;
- a pressure foot in mechanical communication with the spindle motor, the pressure foot vibrating in response to the drill vibrations generated when drilling the workpiece surface; and
- a shock having a first end and a second end, the shock first end including a shaft and a first coupling, the first coupling of the shock first end being pivotally attached to the pressure foot, the shock second end being attached to the spindle motor, wherein the shock mitigates communication of the drill and motor vibrations to the attached drill tool in order to dampen vibrations there at for increasing control of the tool.

50. The invention as set forth in claim 49 wherein the shock is a gas shock.

51. The invention as set forth in claim 49 wherein the shock is adjustable to apply pressure on the workpiece surface.

* * * * *